(12) United States Patent
Matsui et al.

(10) Patent No.: US 8,530,576 B2
(45) Date of Patent: Sep. 10, 2013

(54) THERMOPLASTIC RESIN COMPOSITION AND MOLDED ARTICLE THEREOF

(75) Inventors: Hirokazu Matsui, Tsukuba (JP); Hiroshi Harada, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 177 days.

(21) Appl. No.: 13/034,089

(22) Filed: Feb. 24, 2011

(65) Prior Publication Data
US 2011/0213086 A1   Sep. 1, 2011

(30) Foreign Application Priority Data
Feb. 26, 2010 (JP) .................. 2010-041900

(51) Int. Cl.
*C08L 81/06* (2006.01)
*C08L 79/04* (2006.01)
*C09K 19/10* (2006.01)
*C09K 19/32* (2006.01)

(52) U.S. Cl.
USPC ........... 525/189; 525/150; 525/166; 525/906; 252/299.6

(58) Field of Classification Search
USPC ............... 525/189, 906, 150, 166; 252/299.6
See application file for complete search history.

(56) References Cited

U.S. PATENT DOCUMENTS

| | | | | |
|---|---|---|---|---|
| T952005 | I4 * | 11/1976 | Atwood et al. | 525/189 |
| 4,020,046 | A * | 4/1977 | King et al. | 525/137 |
| 4,477,630 | A * | 10/1984 | Saito et al. | 525/133 |

FOREIGN PATENT DOCUMENTS

JP   2001-146571 A   *   5/2001

OTHER PUBLICATIONS

Machine translation of JP 2001-146571; pub. date: May 2001.*
Information Sheet for Teflon (polytetrafluoroethylene, PTFE)—CAS 9002-84-0, Columbia Analytical Serives, Inc., 2011.*

* cited by examiner

*Primary Examiner* — Fred M Teskin
(74) *Attorney, Agent, or Firm* — Panitch Schwarze Belisario & Nadel LLP

(57) ABSTRACT

The present invention provides a thermoplastic resin composition comprising a polysulfone (A) having oxygen-containing groups selected from among hydroxyl groups and oxyanion groups, a fluororesin (B) and a thermoplastic resin (C) other than the polysulfone (A) and the fluororesin (B). The composition has high slidability. By molding the composition, a molded article with high slidability can be obtained.

8 Claims, No Drawings

THERMOPLASTIC RESIN COMPOSITION AND MOLDED ARTICLE THEREOF

BACKGROUND OF THE INVENTION

1. Field of the Invention

The present invention relates to a thermoplastic resin composition and a molded article thereof.

2. Description of the Related Art

Hard disk drives built in digital household electric appliances are making progress toward larger capacity and smaller size with the recent development of miniaturized digital household electric appliances such as personal computers, DVD recorders, and digital music players. Accordingly, there is a trend to resinification of many structural parts of the hard disk drive (hereinafter sometimes referred to as "HDD parts") because of demands for miniaturized and low cost products. Among these resinified HDD parts, there are ones required to have high slidability. For example, in a hard disk drive which is driven in a load/unload system, a magnetic head support provided with a magnetic head moves at a high speed between a lamp material outside of a magnetic disk and a surface of the magnetic disk along with the operation and suspension of the magnetic disk and slides against the lamp material. Therefore, if the slidability of the lamp material is low, there is a drawback that an abrasion powder is easily generated from the lamp material and adheres to the magnetic disk, giving rise to malfunction. Therefore, high slidability is required for the lamp material. As a resin material for the lamp material, for example, Japanese Patent Application Laid-Open Publication No. 2004-87022 discloses a resin composition containing a fluororesin and an aromatic polysulfone resin.

SUMMARY OF THE INVENTION

The resin composition disclosed in Japanese Patent Application Laid-Open Publication No. 2004-87022 is superior in slidability and can suppress the generation of abrasion powder. However, further improvement in slidability is required for the resin material for HDD parts which are desired to be further miniaturized. In light of this, it is an object of the present invention to provide a resin material having higher slidability.

In order to achieve the above object, the present invention provides a thermoplastic resin composition comprising a polysulfone (A) having oxygen-containing groups selected from among hydroxyl groups and oxyanion groups, a fluororesin (B), and a thermoplastic resin (C) other than the polysulfone (A) and the fluororesin (B).

According to the present invention, a molded article obtained by molding this thermoplastic resin composition is also provided.

The thermoplastic resin composition of the present invention has high slidability and by molding this composition, molded articles suitable as products/parts required to have high slidability, such as HDD parts, can be obtained.

DETAILED DESCRIPTION OF THE PREFERRED EMBODIMENTS

<Polysulfone (A)>

The polysulfone (A) is typically a resin which has an aromatic group on its principal chain and a sulfonyl group ($—SO_2—$) as a group connecting the aromatic groups and is preferably a resin further having a group selected from the group consisting of an oxygen atom, a sulfur atom and an alkylene group having 1 to 3 carbon atoms as a group connecting the aromatic groups.

The polysulfone (A) to be used in the present invention has oxygen-containing groups selected from among hydroxyl groups and oxyanion groups. By using such a polysulfone (A), a resulting thermoplastic resin composition comprising the polysulfone (A) becomes excellent in slidability. It is preferred that the above-described oxygen-containing groups in the polysulfone (A) are all hydroxyl groups from the viewpoint of improving the stability of the thermoplastic resin composition in melt-processing the composition. The oxygen-containing groups are preferably bonded to aromatic ring(s) of the polysulfone (A) so as to serve as phenolic hydroxyl or oxyanion groups thereof. Also, the oxygen-containing group(s) are preferably placed at terminal(s) of a main chain of the polysulfone (A).

The oxyanion group typically exists with a counter-cation attached thereto. Examples of the counter-cation include alkali metal ions such as a lithium ion, a sodium ion and a potassium ion, alkaline earth metal ions such as a magnesium ion and a calcium ion, ammonium ions obtained by protonating ammonia or primary to tertiary amine, and quaternary ammonium ions. When the counter-cation is a polyvalent cation such as an alkaline earth metal ion, the counter-anion may be comprised of a plurality of oxyanion groups, or may be comprised of an oxyanion group, and other anions such as a chloride ion and a hydroxide ion.

A number (amount) of the oxygen-containing groups in the polysulfone (A) may be $6 \times 10^{-5}$ or more, preferably $8 \times 10^{-5}$ or more, and may be $20 \times 10^{-5}$ or less, preferably $17 \times 10^{-5}$ or less, each being based on 1 g of the polysulfone (A). The slidability of the resulting thermoplastic resin composition tends to be improved with increase in the number (amount) of the oxygen-containing groups. However, if the amount of the oxygen-containing groups is too large, the strength of the thermoplastic resin composition may easily decrease, undesirably.

The polysulfone (A) is typically one having a repeat unit represented by the following formula (1) (hereinafter sometimes referred to as a "repeat unit (1)") and may be provided with a repeat unit represented by the following formula (2) (hereinafter sometimes referred to as a "repeat unit (2)") and/or a repeat unit represented by the following formula (3) (hereinafter sometimes referred to as a "repeat unit (3)"). In the polysulfone (A), the content of the repeat unit (1) is preferably 50 mol % or more and more preferably 80 mol % or more based on the total amount of all the repeat units.

$$-Ph^1-SO_2-Ph^2-O— \quad (1)$$

$Ph^1$ and $Ph^2$ each independently represent a group represented by the following formula (4).

$$-Ph^3-R-Ph^4-O— \quad (2)$$

$Ph^3$ and $Ph^4$ each independently represent a group represented by the following formula (4) and R represents an alkylidene group or an alkylene group having 1 to 3 carbon atoms, an oxygen atom or a sulfur atom.

$$-(Ph^5)_n-O— \quad (3)$$

$Ph^5$ represents a group represented by the following formula (4), and n represents an integer from 1 to 5. When n is 2 or more, plural $Ph^5$s may be the same or different.

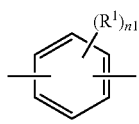

(4)

$R^1$ represents an alkyl group having 1 to 3 carbon atoms, a halogeno group, a sulfo group, a nitro group, an amino group, a carboxyl group, a phenyl group, or an oxygen-containing group selected from among hydroxyl group and oxyanion group. n1 represents an integer from 0 to 2, wherein two $R^1$s may be the same or different when n1 is 2.

Examples of a method of producing the polysulfone (A) include a method in which a corresponding dihydric phenol and a dihalogenobenzenoid compound are polycondensed in an organic high-polar solvent by using an alkali metal salt of carbonic acid. At this time, the molar ratio of the raw materials and reaction temperature are adjusted in consideration of side reactions such as a depolymerization reaction of the polysulfone (A) by the by-produced alkali hydroxide and a substitution reaction of the halogen group to be the oxygen-containing group such as a hydroxyl group and an oxyanion group, thereby enabling the oxygen-containing groups to be introduced into the resulting polysulfone (A).

Examples of the dihydric phenol include
4,4'-dihydroxydiphenylsulfone,
bis(4-hydroxy-3,5-dimethylphenyl)sulfone,
4,4'-sulfonyl-2,2'-diphenylbisphenol, hydroquinone, resorcin, catechol, phenylhydroquinone,
2,2-bis(4-hydroxyphenyl)propane,
2,2-bis(4-hydroxyphenyl)hexafluoropropane,
4,4'-dihydroxydiphenyl, 2,2'-dihydroxydiphenyl,
3,5,3',5'-tetramethyl-4,4'-dihydroxydiphenyl,
2,2'-diphenyl-4,4'-bisphenol,
4,4'''-dihydroxy-p-quata-phenyl, 4,4'-dihydroxydiphenyl sulfide, bis(4-hydroxy-3-methylphenyl)sulfide, and
4,4'-oxydiphenol.

Examples of the dihalogenobenzenoid compound include 4,4'-dichlorodiphenylsulfone, 4-chlorophenyl-3',4'-dichlorophenylsulfone, and 4,4'-bis(4-chlorophenylsulfonyl)diphenyl. As the dihalogenobenzenoid compound, those in which the halogen atom is activated by the sulfonyl group bonded at the para-position with respect to the halogen atom are preferable.

A compound having a phenolic hydroxyl group and a halogen atom, for example, 4-hydroxy-4'-(4-chlorophenylsulfonyl)biphenyl may also be used in place of all or part of the dihydric phenol and dihalogenobenzenoid compound.

The amount of the dihalogenobenzenoid compound to be used is preferably 80 to 110 mol % based on the dihydric phenol in view of increasing the molecular weight of the polysulfone (A). The amount of the dihalogenobenzenoid compound is preferably 98 to 105 mol % to obtain a higher molecular weight polysulfone (A).

Examples of the organic high-polar solvent include dimethylsulfoxide, 1-methyl-2-pyrrolidone, sulfolane(1,1-dioxothiram), 1,3-dimethyl-2-imidazolidinone, 1,3-diethyl-2-imidazolidinone, dimethylsulfone, diethylsulfone, diisopropylsulfone and diphenylsulfone.

The alkali metal salt of carbonic acid may be commonly-used salts such as sodium carbonate and potassium carbonate or acid salts such as sodium bicarbonate and potassium bicarbonate or a combination of the both. The amount of the alkali metal salt of carbonic acid is preferably 0.95 mol equivalent or more and more preferably 1.001 to 1.25 mol equivalent as the ratio of the alkali metal to the phenolic hydroxyl group of the dihydric phenol. When the amount of the alkali metal salt of carbonic acid to be used is too large, it causes easy cleavage and decomposition of the polysulfone (A) to be produced whereas when the amount is too small, the polymerization hardly proceeds, showing that either of the above cases is undesirable because it is difficult to obtain a high-molecular polysulfone (A).

In a typical production method, the dihydric phenol and the dihalogenobenzenoid compound are dissolved in an organic polar solvent in a first stage, the alkali metal salt of carbonic acid is added to the obtained solution to undergo polycondensation of the dihydric phenol and the dihalogenobenzenoid compound in a second stage, and an unreacted alkali metal salt of carbonic acid, alkali metal salts such as by-produced alkali metal halides and the organic polar solvent are removed from the obtained reaction mixture to obtain a polysulfone (A) in a third stage.

Here, the dissolution temperature in the first stage may be in the range of from 40 to 180° C., while the polycondensation temperature in the second stage may be in the range of from 180 to 400° C. A higher polycondensation temperature brings about a tendency to give a polysulfone (A) having a higher molecular weight and is therefore desirable. However, an excessively high temperature easily gives rise to side reactions such as decomposition and is therefore undesirable. An excessively low temperature, on the other hand, causes retardation of the reaction and is therefore undesirable. It is preferable that the temperature of the reaction system is gradually raised with removing by-produced water and the mixture is further stirred for 1 to 50 hours and preferably 10 to 30 hours after the temperature reaches the reflux temperature of the organic polar solvent.

The following process may also be adopted in place of the above first and second stages: first, the alkali metal salt of carbonic acid, dihydric phenols and the organic polar solvent may be mixed and reacted in advance to remove by-produced water in advance. At this time, in order to remove water from the reaction solution, azeotropic dehydration may be performed by mixing the reaction solution with an organic solvent which forms an azeotrope with water. Examples of the organic solvent which forms an azeotrope with water include benzene, chlorobenzene, toluene, methyl isobutyl ketone, hexane and cyclohexane. The azeotropic dehydration temperature may be in the range of from 70 to 200° C. although it depends on the temperature at which the azeotropic solvent forms an azeotrope with water.

Then, the reaction is continued until the solvent and water form no azeotrope and then, the dihalogenobenzenoid compound is mixed to undergo polycondensation at typically 180 to 400° C. in the same manner as above. In this case, as the polycondensation temperature is higher, a polysulfone (A) having a higher molecular weight tends to be obtained and is therefore preferable. If the temperature is too high, it is undesirable because side reactions such as decomposition tend to occur. If the temperature is too low on the other hand, it causes retardation of the reaction and is therefore undesirable.

In the third stage, an alkali metal salt of carbonic acid and alkali metal salts such as by-produced alkali metal halides can be removed from the reaction mixture by a filter or a centrifugal separator to obtain a solution in which the polysulfone (A) is dissolved in an organic polar solvent. The organic polar solvent can be removed from the solution to thereby obtain a polysulfone (A). For the removal of the organic polar solvent, there can be adopted a method in which the organic polar solvent is directly distilled off from the polysulfone (A) solution or a method in which the polysulfone (A) solution is added once in a poor solvent for the polysulfone (A) to precipitate the polysulfone (A), which is then separated by, for example, filtration or centrifugal separation.

In the case where an organic polar solvent having a relatively high melting point is used as the polymerization solvent, the following method may be adopted. Specifically, after the second stage, the reaction mixture is cooled to solidify, the solid solution is milled and then, water, and a solvent which cannot dissolve the polysulfone (A) but can dissolve the organic polar solvent are used to extract and remove unreacted alkali metal salts of carbonic acid, alkali metal salts such as by-produced alkali metal halides and the organic polar solvent.

The particle diameter of the milled particles is preferably 50 to 2000 μm as the center particle diameter in view of extraction efficiency and workability in the extraction operation. If the particle diameter of the milled particles is too large, the extraction efficiency is deteriorated whereas if the milled particle diameter is too small, particles are consolidated in the extraction of the solution and clogging is caused when filtration or drying is carried out after the extraction process, and therefore, both cases are undesirable. The milled particle diameter is preferably 100 to 1500 μm and more preferably 200 to 1000 μm.

As the extraction solvent, a mixed solvent of acetone and methanol may be used when, for example, diphenylsulfone is used as the polymerization solvent. Here, the mixing ratio of acetone and methanol is preferably determined based on the extraction efficiency and fixation of the polysulfone (A).

The reduced viscosity of the polysulfone (A) can be an index of molecular weight and is preferably 0.25 to 0.60 dl/g. When the polysulfone (A) with too small reduced viscosity is used, then the mechanical strength of a molded article obtained from the resulting thermoplastic resin composition of the present invention tends to become low, and also a gas may be generated when the thermoplastic resin composition is molded. When the polysulfone (A) with too large reduced viscosity (which may corresponding to the polysulfone (A) with a small amount of the oxygen-containing group) is used, the compatibility of the polysulfone (A) with the fluororesin (B) tends to easily deteriorated. When the balance between the moldability of the thermoplastic resin composition of the present invention and the mechanical strength of the obtained molded article is considered in this manner, the reduced viscosity is more preferably 0.30 to 0.55 dl/g and even more preferably 0.36 to 0.55 dl/g.

Examples of commercially available products of the polysulfone (A) include "Sumikaexcel 5003P" manufactured by Sumitomo Chemical Co., Ltd.

<Fluororesin (B)>

The fluororesin (B) is a resin having a carbon-fluorine bond and examples of the fluororesin include polytetrafluoroethylene (PTFE), a polytetrafluoroethylene-hexafluoropropylene copolymer (FEP), polychlorotrifluoroethylene (PCTFE), polytrichlorofluoroethylene, polyvinylidene fluoride (PVDF), polyvinyl fluoride (PVF), an ethylene-tetrafluoroethylene copolymer (ETRE), an ethylene-chlorotrifluoroethylene copolymer (ECTRE), and a tetrafluoroethylene-perfluoroalkyl vinyl ether copolymer (PFA). Among these compounds, PTFE is preferable in view of heat resistance during the processing.

A PTFE powder having an average particle diameter less than 20 μm is preferably used as PTFE. Examples of commercially available products of PTFE include "Fluon L169J", "Fluon L150J", "Fluon L170J", "Fluon L172J", and "Fluon L173J" manufactured by Asahi Glass Co., Ltd.; "Lubron L-2", "Lubron L-5", and "Lubron LD-1" manufactured by Daikin Industries, Ltd.); "Teflon (registered trademark) TLP-10" and "Teflon (registered trademark) TLP-10E-1" manufactured by Du Pont; "Cefral lub I", "Cefral lub IP" and "Cefral lub V" manufactured by Central Glass Co., Ltd.; and Dyneon TF/TFM" manufactured by Sumitomo 3M Limited.

The fluororesin (B) has a flow initiation temperature of preferably 400° C. or less and more preferably 360° C. or less. The fluororesin (B) having such a flow initiation temperature is improved in compatibility with the thermoplastic resin (C). This brings about better dispersibility of the fluororesin (B) in a matrix made of the thermoplastic resin (C) in the molded article.

Here, the flow initiation temperature means a temperature at which a heat melt has a melt viscosity of 4800 Pa·s (48000 poise) when it is extruded from a nozzle with heating at a rate of 4° C./min under a load of 9.81 MPa (100 kgf/cm$^2$) by using a capillary tube rheometer provided with a capillary having an inside diameter of 1 mm and a length of 10 mm.

Examples of commercially available products of PTFE which has a fluidization temperature of 360° C. or less and is a preferable fluororesin (B) include "Cefral lub I" (flow initiation temperature: 329° C.) and "Cefral lub IP" (flow initiation temperature: 337° C.) manufactured by Central Glass Co., Ltd.; Dyneon TF9205" (flow initiation temperature: 330° C.) manufactured by Sumitomo 3M Limited; "Lubron L-5" (flow initiation temperature: 350° C.) and "Fluon L169J" (flow initiation temperature: 358° C.) manufactured by Asahi Glass Co., Ltd.

<Thermoplastic Resin (C)>

The thermoplastic resin (C) is a resin which is softened and solidified reversibly when heating and cooling are repeated. The thermoplastic resin (C) may be largely classified into a liquid crystalline thermoplastic resin (C1), a crystalline thermoplastic resin (C2) and an amorphous thermoplastic resin (C3).

<Liquid Crystalline Thermoplastic Resin (C1)>

The liquid crystalline thermoplastic resin (C1) is a resin which has optical anisotropy when it is melted and forms an anisotropic melt at 450° C. or less. This optical anisotropy can be confirmed by a usual polarization detection method utilizing a cross polarizer. The liquid crystalline thermoplastic resin (C1) has a molecular chain which has a long, narrow and flat molecular form and also has high stiffness along the long chain of the molecule (this molecular chain having high stiffness is called a "mesogen group"), wherein the mesogen group is bonded to the high-molecular principal chain and/or side chain. When higher heat resistance is required, a liquid crystalline thermoplastic resin having a mesogen group at its high-molecular principal chain is preferable.

Examples of the liquid crystalline thermoplastic resin (C1) include a liquid crystalline polyester, a liquid crystalline polyester amide, a liquid crystalline polyester ether, a liquid crystalline polyester carbonate, a liquid crystalline polyester imide and a liquid crystalline polyamide. Among these materials, a liquid crystalline polyester, a liquid crystalline polyester amide and a liquid crystalline polyamide are preferable from the viewpoint of obtaining a high-strength resin molded article, and a liquid crystalline polyester and a liquid crystalline polyester amide are preferable from the viewpoint of obtaining a molded article having lower water-absorptivity.

Preferable examples of the liquid crystalline thermoplastic resin (C1) include the following resins (C1-1), (C1-2), (C1-3), (C1-4), (C1-5), and (C1-6). Two or more of these resins may be combined.

(C1-1): Liquid crystalline polyesters having a repeat unit represented by the following formula (i) (hereinafter sometimes referred to as a "repeat unit (i)").

(C1-2): Liquid crystalline polyesters having a repeat unit represented by the following formula (ii) (hereinafter sometimes referred to as a "repeat unit (ii)") and a repeat unit represented by the following formula (iii) (hereinafter sometimes referred to as a "repeat unit (iii)").

(C1-3): Liquid crystalline polyesters having a repeat unit represented by the following formula (i), a repeat unit represented by the following formula (ii), and a repeat unit represented by the following formula (iii).

(C1-4): Liquid crystalline polyester amides or liquid crystalline polyamides obtained by replacing a part or all of the repeat units represented by the following formula (i) with a repeat unit represented by the following formula (iv) (hereinafter sometimes referred to as a "repeat unit (iv)") in the above (C1-1).

(C1-5): Liquid crystalline polyester amides or liquid crystalline polyamides obtained by replacing a part or all of the repeat units represented by the following formula (iii) with a repeat unit represented by the following formula (v) (hereinafter sometimes referred to as a "repeat unit (v)") and/or with a repeat unit represented by the following formula (vi) (hereinafter sometimes referred to as a "repeat unit (vi)") in the above (C1-2).

(C1-6): Liquid crystalline polyester amides obtained by replacing a part or all of the repeat units represented by the following formula (iii) with a repeat unit represented by the following formula (v) and/or with a repeat unit represented by the following formula (vi) in the above (C1-3).

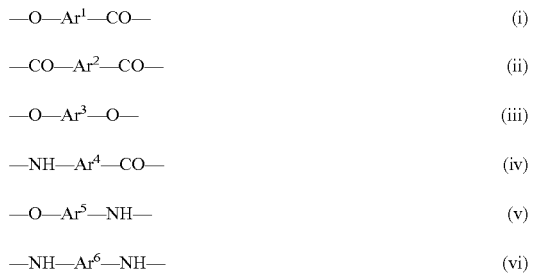

$Ar^1$ and $Ar^4$ each independently represent a 1,4-phenylene group, a 2,6-naphthalenediyl group or a 4,4'-biphenylylene group. $Ar^2$, $Ar^3$, $Ar^5$ and $Ar^6$ each independently represent a 1,4-phenylene group, a 2,6-naphthalenediyl group, a 1,3-phenylene group or a 4,4'-biphenylylene group. In this case, hydrogen atoms of the groups represented by $Ar^1$, $Ar^2$, $Ar^3$, $Ar^4$, $Ar^5$ and $Ar^6$ may be each independently substituted with a halogen atom, an alkyl group or an aryl group.

The repeat unit (i) is a repeat unit derived from aromatic hydroxycarboxylic acids. Examples of the aromatic hydroxycarboxylic acid include 4-hydroxybenzoic acid, 3-hydroxybenzoic acid, 6-hydroxy-2-naphthoic acid, 7-hydroxy-2-naphthoic acid, 6-hydroxy-1-naphthoic acid, 4'-hydroxybiphenyl-4-carboxylic acid and those obtained by substituting a part or all of hydrogen atoms on the aromatic ring of each of these aromatic hydroxycarboxylic acids with an alkyl group, an aryl group or a halogen atom.

The repeat unit (ii) is a repeat unit derived from aromatic dicarboxylic acids. Examples of the aromatic dicarboxylic acid include terephthalic acid, phthalic acid, 4,4'-diphenyldicarboxylic acid, 2,6-naphthalenedicarboxylic acid, isophthalic acid and those obtained by substituting a part or all of hydrogen atoms on the aromatic ring of each of these aromatic dicarboxylic acids with an alkyl group, an aryl group or a halogen atom.

The repeat unit (iii) is a repeat unit derived from aromatic diols. Examples of the aromatic diol include hydroquinone, resorcin, naphthalene-2,6-diol, 4,4'-biphenylenediol, 3,3'-biphenylenediol, 4,4'-dihydroxydiphenyl ether, 4,4'-dihydroxydiphenylsulfone and those obtained by substituting a part or all of hydrogen atoms on the aromatic ring of each of these aromatic diols with an alkyl group, an aryl group or a halogen atom.

The repeat unit (iv) is a repeat unit derived from aromatic aminocarboxylic acids. Examples of the aromatic aminocarboxylic acid include 4-aminobenzoic acid, 3-aminobenzoic acid, 6-amino-2-naphthoic acid and those obtained by substituting a part or all of hydrogen atoms on the aromatic ring of each of these aromatic aminocarboxylic acids with an alkyl group, an aryl group or a halogen atom.

The repeat unit (v) is a repeat unit derived from aromatic hydroxyamines. Examples of the aromatic hydroxyamine include 4-aminophenol, 3-aminophenol, 4-amino-1-naphthol, 4-amino-4'-hydroxydiphenyl and those obtained by substituting a part or all of hydrogen atoms on the aromatic ring of each of these aromatic hydroxyamines with an alkyl group, an aryl group or a halogen atom.

The repeat unit (vi) is a repeat unit derived from aromatic diamines. Examples of the aromatic amine include 1,4-phenylenediamine, 1,3-phenylenediamine and those obtained by substituting a part or all of hydrogen atoms on the aromatic ring of each of these aromatic diamines with an alkyl group, an aryl group or a halogen atom.

Here, examples of the alkyl group as the substituent which may be contained in the repeat units (i) to (vi) include straight-chain, branched or alicyclic alkyl groups having 1 to 10 carbon atoms such as a methyl group, an ethyl group, a propyl group, an isopropyl group, a butyl group, a tert-butyl group, a hexyl group, a cyclohexyl group, an octyl group and a decyl group. Examples of the aryl group include aryl groups having 6 to 10 carbon atoms such as a phenyl group and a naphthyl group. Examples of the halogen atom include a fluorine atom, a chlorine atom, a bromine atom and an iodine atom.

Among the aforementioned preferable liquid crystalline thermoplastic resins (C1), liquid crystalline polyesters selected from the group consisting of (C1-1) to (C1-3) are preferable from the viewpoint of obtaining a molded article superior in heat resistance and dimensional stability and liquid crystalline polyesters (C1-3) are more preferable.

Details of the liquid crystalline polyesters (C1-3) which are the liquid crystalline thermoplastic resins (C1) especially preferably used in the present invention will be explained.

The liquid crystalline polyesters (C1-3) are those containing the repeat units (i), (ii) and (iii). When the total of these units is 100 mol %, it is preferable that the total of the unit (i) be 30 to 80 mol %, the total of the unit (ii) be 10 to 35 mol % and the total of the unit (iii) be 10 to 35 mol %. The molar ratio (repeat unit (ii)/repeat unit (iii)) of the repeat unit (ii) to the repeat unit (iii) is preferably 0.9/1.0 to 1.0/0.9. When this ratio is substantially 1 (repeat unit (ii)/repeat unit (iii)=1.0/1.0), the numbers of carboxyl groups and hydroxyl groups which can form an ester bond are equal to each other in the production of the liquid crystalline polyester and this is advantageous because the molecular weight of an obtained liquid crystalline polyester is increased and therefore, a molded article having higher heat resistance is obtained.

Here, when the amount of the repeat unit (i) is too small and the amount of the repeat unit (ii) and/or the repeat unit (iii) is too large, the obtained polyester tends to scarcely develop liquid-crystallinity.

When the amount of the repeat unit (i) is too large and the amount of the repeat unit (ii) and/or the repeat unit (iii) is too small, the obtained liquid crystalline polyester tends to scarcely melt, leading to deteriorated moldability.

The repeat unit (i) is preferably 40 to 70 mol % and more preferably 45 to 65 mol %.

On the other hand, the repeat units (ii) and (iii) are respectively preferably 15 to 30 mol % and more preferably 17.5 to 27.5 mol %.

Then, a method of producing a preferable liquid crystalline polyester (C1-3) will be explained. Such a liquid crystalline polyester is obtained by polymerizing raw material monomers from which the liquid crystalline polyester is derived, that is, an aromatic hydroxycarboxylic acid, an aromatic dicarboxylic acid and an aromatic diol by a known method. In this case, it is preferable to produce a liquid crystalline polyester after the raw material monomers are converted into ester-forming derivatives in view of easy production of a liquid crystalline polyester.

The ester-forming derivative has such a group as to promote an ester forming reaction. In the case of using a raw material monomer having a carboxyl group in its molecule, examples of the ester-forming derivative may include those improved in ester-forming ability by converting the carboxyl group into a haloformyl group or an acyloxycarbonyl group and those obtained by forming an alkoxycarbonyl group by a lower alcohol so that the carboxyl group easily forms an ester bond by an ester exchange reaction. In the case of using a raw material monomer having a hydroxyl group in its molecule, examples of the ester-forming derivative include those improved in ester-forming ability by converting the hydroxyl group into a lower acyloxyl group.

In the production of a liquid crystalline polyester by using such an ester-forming derivative, the method using the ester-forming derivative obtained by converting hydroxyl groups in the aromatic hydroxycarboxylic acid and aromatic diol into lower acyloxyl groups is particularly preferable. In this case, an acetyloxyl group is preferable as the lower acyloxyl group. The acetylation can be attained by reacting a compound having a hydroxyl group with acetic acid anhydride.

Examples of the method of producing a liquid crystalline polyester by using the ester-forming derivative include a method described in Japanese Patent Application Laid-Open Publication No. 2002-146003. Specifically, monomers corresponding to the repeat units (i), (ii) and (iii) are mixed and acylated using acetic acid anhydride to form an ester-forming derivative, and then, raw material monomers including the ester-forming derivatives are melt-polymerized, thereby making it possible to obtain a liquid crystalline polyester.

Here, in the case of intending to obtain a molded article having higher heat resistance, it is preferable that the liquid crystalline polyester obtained by the melt polymerization is used as a prepolymer, and the prepolymer is further made to have a higher molecular weight. In this case, the use of solid-phase polymerization is advantageous in producing a higher-molecular weight polymer. This solid-phase polymerization may be carried out by milling the prepolymer into a powder and then heating the powder.

When the prepolymer is milled into a powder, it is preferably milled, for example, after being cooled to solidify. The average particle diameter of the powder obtained by the milling is preferably 0.05 to 3 mm and more preferably 0.05 to 1.5 mm from the viewpoint of promoting the formation of a liquid crystalline polyester having a higher molecular weight. The average particle diameter is even more preferably 0.1 to 1.0 mm because this provides resistance to sintering between particles, so that the operability of the solid-phase polymerization tends to be improved, which promotes the formation of a liquid crystalline polyester having a higher molecular weight efficiently.

In typical solid-phase polymerization, first, the temperature of the prepolymer is raised from ambient temperature up to a temperature lower by 20° C. or more than the flow initiation temperature of the prepolymer. At this time, the time required for raising the temperature is preferably within 1 hour from the viewpoint of saving the reaction time, though no particular limitation is imposed on it.

Then, the temperature of the prepolymer is raised to 280° C. or more from a temperature lower by 20° C. or more than the flow initiation temperature of the prepolymer. The temperature is raised at a rise rate of preferably 0.3° C./min or less and more preferably 0.1 to 0.15° C./min. If the temperature rise rate is 0.3° C./min or less, the sintering among particles is scarcely caused, enabling the production of a liquid crystalline polyester having a higher molecular weight.

The prepolymer is preferably reacted at 280° C. or more and more preferably 280 to 400° C. for 30 minutes or more in the final stage of the solid-phase polymerization to increase the molecular weight of the liquid crystalline polyester further. Particularly, it is preferable to undergo a reaction at 280 to 350° C. for 30 minutes to 30 hours and it is more preferable to undergo a reaction at 285 to 340° C. for 30 minutes to 20 hours from the viewpoint of further improving the heat stability of the liquid crystalline polyester. These heating conditions are preferably optimized properly according to the types of raw material monomers to be used in the production of the liquid crystalline polyester.

The liquid crystalline polyester (C1-3) obtained by carrying out the solid-phase polymerization has a sufficiently high molecular weight, making it possible to obtain a molded article having high heat resistance. The flow initiation temperature of the liquid crystalline polyester is preferably 280° C. or more and more preferably 280 to 390° C.

The flow initiation temperature of the liquid crystalline polyester has the same meaning as that of the flow initiation temperature of the fluororesin (B). Namely, the flow initiation temperature of the liquid crystalline polyester means a temperature at which the liquid crystalline polyester has a melt viscosity of 4800 Pa·s (48000 poise) when it is extruded from a nozzle with heating at a rate of 4° C./min under a load of 9.8 MPa (100 kgf/cm$^2$) by using a capillary tube rheometer provided with a dice having an inside diameter of 1 mm and a length of 10 mm. This flow initiation temperature is an index of the molecular weight of a liquid crystalline polyester which is well-known in the technical field concerned (see "Synthesis, Molding, and Application of Liquid Crystalline Polymer", edited by Naoyuki KOIDE, pp. 95-105, CMC, published on Jun. 5, 1987. In the present invention, a flow characteristics-measuring device "Flow Tester CFT-500D" manufactured by Shimadzu Corporation is used as the device for measuring the flow initiation temperature).

Although the method of producing a liquid crystalline polyester (C1-3) which is preferable as the liquid crystalline thermoplastic resin (C1) to be used in the present invention is explained above, other liquid crystalline thermoplastic resins (C1) can also be easily produced by a production method like the aforementioned methods using an ester-forming derivative.

<Crystalline Thermoplastic Resin (C2)>

The crystalline thermoplastic resin (C2) means a resin having a molecular structure in which a crystalline region where long chain molecules are regularly arranged and an amorphous region where long chain molecules are irregularly arranged are present. Examples of the crystalline thermoplastic resin (C2) include a polyethylene, a polypropylene, a polyacetal, a polybutylene terephthalate (PBT), a polyethylene terephthalate (PET), a polyphenylene sulfide (PPS), a polyimide (PI), a polyether ether ketone (PEEK), a polyethylene naphthalate (PEN), an aliphatic polyamide, a semi-aromatic polyamide, and an aromatic polyamide.

The crystalline thermoplastic resin (C2) has a clear melting point. Examples of commercially available products of the crystalline thermoplastic resin (C2) include a polyethylene (melting point (m.p.): 108 to 136° C.), a polypropylene (m.p. about 165° C. or lower), a polyacetal (m.p. 175° C.), a polybutylene terephthalate or PBT (224° C.), a polyethylene terephthalate or PET (m.p. 263° C.), a polyphenylene sulfide or PPS (m.p. 285° C.), a polyimide or PI (m.p. 388° C.; including "AURUM PL500", manufactured by Mitsui Chemicals, Inc.), a polyether ether ketone or PEEK (m.p. 334° C.), a polyethylene naphthalate or PEN (m.p. 340° C.; including "IDEMITSU PEN-RF", manufactured by Idemitsu Petrochemical Co., Ltd.), an aliphatic polyamide or PA (ex. polyamide 46 (PA46): m.p.295° C.; including "Stanyl TS300", manufactured by DSM Engineer Plastics), and an aromatic polyamide (ex. polyamide 9T (PA9T): m.p. 304° C.; including "Genestar N1000A", manufactured by Kuraray Ltd.).

A resin having a melting point of 200° C. or more is preferable and a resin having a melting point of 250° C. or more is more preferable in consideration of a difference in processing temperature between the aromatic polysulfone resin (component A) and the fluorocarbon polymer (component B) which are other components.

<Amorphous Thermoplastic Resin (C3)>

The amorphous thermoplastic resin (C3) is a resin substantially having a molecular structure in which a crystalline region where long chain molecules are regularly arranged does not exist and which is constituted only of an amorphous region where long chain molecules are irregularly arranged. Examples of the amorphous thermoplastic resin (C3) include a polystyrene, a polycarbonate, a polysulfone, polyether imide and polyamideimide. In this case, as the polysulfone which is the amorphous thermoplastic resin (C3), the same one as the polysulfone (A) may be used except that it contains no oxygen-containing group such as a hydroxyl group and an oxyanion group.

<Thermoplastic Resin Composition>

The thermoplastic resin composition of the present invention contains the polysulfone (A), the fluororesin (B) and the thermoplastic resin (C). The content of the polysulfone (A) is preferably 0.3 to 40% by mass based on the total amount of the thermoplastic resin composition. When the content of the polysulfone (A) is too small, the dispersing effect of the fluororesin (B) tends to become insufficient in the obtained molded article. When the content of the polysulfone (A) is too large, on the other hand, the melt stability is deteriorated and the thermoplastic resin composition may be thickened in the process of producing the thermoplastic resin composition by melt processing and in the process of molding the thermoplastic resin composition into a molded article. There is a possibility in that an extremely thickened block could be generated and a nozzle of a processing device could be clogged.

On the other hand, the content of the fluororesin (B) in the thermoplastic resin composition of the present invention is determined according to the degree of slidability to be required. The content of the fluororesin (B) is preferably 0.3 to 50% by mass based on the total amount of the thermoplastic resin composition. When the content of the fluororesin (B) is too small, there is a fear as to, for example, slidability insufficient for HDD parts, whereas when the content of the fluororesin (B) is too large, there is a tendency that fluidity during the processing is deteriorated and also the mechanical strength of the obtained molded article is reduced. The content of the fluororesin (B) is more preferably 5 to 40% by mass, even more preferably 5 to 30% by mass and particularly preferably 10 to 30% by mass to keep a good balance between slidability and processability or mechanical strength.

The thermoplastic resin composition of the present invention may further contain a component other than the polysulfone (A), the fluororesin (B) and the thermoplastic resin (C), as necessary to improve, for example, mechanical strength. Examples of the other component include fillers such as a fibrous filler, a plate filler, a spherical filler, a powder filler, a hetero filler, and a whisker and, besides, colorants, lubricants, various surfactants, antioxidants, heat stabilizers, ultraviolet absorbers and antistatic agents.

Examples of the fibrous filler include glass fibers, PAN type carbon fibers, pitch type carbon fibers, silica-alumina fibers, silica fibers, alumina fibers, other ceramic fibers, liquid crystal polymer (LCP) fibers, aramid fibers, and polyethylene fibers. Examples of the plate filler include talc, mica, graphite, and wollastonite. Examples of the spherical filler include glass beads and glass balloons. Examples of the powder filler include calcium carbonate, dolomite, clay barium sulfate, titanium oxide, carbon black, conductive carbon, and microparticle silica. Examples of the hetero filler include glass flakes and hetero-section glass fibers. Examples of the whisker include wollastonite and potassium titanate fibers. Solid lubricants such as molybdenum disulfide, heat resistant resin particles such as oxybenzoyl polyester and polyimide, and coloring materials such as dyes and pigments can also be mentioned as examples of other components. The other component optionally used as described above may be used singly or two or more of the optional component may be used in combination. The optional component may be used in the amount of 250 parts by mass or less, preferably 150 parts by mass or less; and is more preferably used in the amount of 100 parts by mass or less, and is even more preferably in the amount of 67 parts by mass or less, each amount being based on the total amount of the polysulfone (A), the fluororesin (B) and the thermoplastic resin (C).

Although the reason why the thermoplastic resin composition comprising the polysulfone (A), the fluororesin (B) and the thermoplastic resin (C) according to the present invention is superior in slidability to a conventional thermoplastic resin composition which does not contain the polysulfone (A) but contains the fluororesin (B) and the thermoplastic resin (C) is not clarified, it is inferred that the oxygen-containing groups such as hydroxyl groups and an oxyanion groups of the polysulfone (A) serves nucleophilically on carbon to which fluorine is bonded in the fluororesin (B) to develop high affinity. Namely, the polysulfone (A) effectively may function as a dispersing medium of the fluororesin (B), with the result that the fluororesin (B) would be highly dispersed.

<Method of Producing Thermoplastic Resin Composition>

The thermoplastic resin composition of the present invention is preferably produced by melt-kneading the polysulfone (A), the fluororesin (B), the thermoplastic resin (C) and, as necessary, other components and more preferably produced by making pellets after the melt-kneading, from the viewpoint of obtaining a molded article from the thermoplastic resin composition more easily. Specifically, the polysulfone (A), the fluororesin (B) and the thermoplastic resin (C) and, as required, other components may be mixed by using, for example, a Henschel mixer or a tumbler and the mixture is melt-kneaded by using an extruder, or the polysulfone (A), the fluororesin (B) and the thermoplastic resin (C) and, as required, other components may be separately put into an extruder to be melt-kneaded. In the latter case, though the order of these components to be put into the extruder is arbitrary, a method may be adopted in which components other than the thermoplastic component are put after the thermoplastic component is sufficiently heat-melted in advance. Alternatively, a combination of the above methods may be adopted, that is, a part of the components are mixed and dispersed, and the mixture is put into the remaining thermoplastic resin heat-melted in the extruder to be knead. The melt kneading is not necessarily carried out by using an extruder and a Banbury mixer or a roll may be used. In this case, as the extruder, a biaxial kneading extruder is preferably used.

<Method of Molding Thermoplastic Resin Composition>

The thermoplastic resin composition of the present invention can be applied to conventionally known melt-molding and preferably injection molding, extrusion molding, compression molding, blow molding, vacuum molding and press molding. The thermoplastic resin composition can also be applied to film formation such as film molding and inflation molding, and melt spinning.

Particularly, injection molding is advantageous from the viewpoint of producing molded articles having various forms and having high productivity. In preferred injection molding, first, the flow initiation temperature FT (° C.) of the thermoplastic resin composition is found. Here, the method of measuring the flow initiation temperature is the same as the method of measuring the flow initiation temperature of the fluororesin (B).

Then, based on the flow initiation temperature FT (° C.) of the thermoplastic resin composition, the thermoplastic resin composition is melted at a temperature (melt temperature) of (FT)° C. or more and (FT+250)° C. or less and injection-molded into a mold set to 0° C. or more. In this case, the thermoplastic resin composition is preferably dried before the injection molding.

When the melt temperature is too low, the fluidity of the resin is so low that the resin cannot be sometimes completely filled into fine shape parts and the transferability of the resin to the surface of the mold is low, bringing about a tendency that the surface of the molded article is roughened, which is undesirable. When the melt temperature is too high, on the other hand, the thermoplastic resin component retained in the molding machine is easily decomposed, giving rise to easy occurrence of abnormal external appearance such as swelling of the surface of the molded article and easy generation of gases, which is undesirable. The melt temperature is preferably (FT+10)° C. or more and (FT+200)° C. or less and more preferably (FT+15)° C. or more and (FT+180)° C. or less in consideration of the stability and moldability of the molded article.

The temperature of the mold is determined in consideration of the appearance, dimension and mechanical strength as well as productivity such as processability and molding cycle though it may be set to 0° C. or more as mentioned above. Typically, the temperature of the mold is preferably 40° C. or more and more preferably 50° C. or more. When the temperature of the mold is too low, it is difficult to control the temperature of the mold in continuous molding and there is the case where the resulting variation in the temperature has an adverse influence on the molded article. Also, the surface smoothness of the resulting molded article may be deteriorated, and therefore, which may result in decreasing the abrasive resistance of the molded article. It is more advantageous that the temperature of the mold is higher from the viewpoint of improving the surface smoothness. However, if the temperature of the mold is too high, this brings about a reduced cooling effect, causing a longer time required for the cooling process, and therefore, the productivity is deteriorated and the molded article is deformed because of deteriorated releasability, which is undesirable. To mention further, if the temperature of the mold is too high, the engagement of the mold is degraded, and therefore, there is a possibility of breakage of the molded article when the mold is opened or closed. It is preferable to properly optimize the upper limit of the temperature of the mold according to the type of the thermoplastic resin composition to be applied, to prevent the decomposition of the thermoplastic resin composition. The temperature of the mold is more preferably 50° C. or more and 220° C. or less and even more preferably 70° C. or more and 200° C. or less.

<Application of Molded Article>

The thermoplastic resin composition of the present invention is suitable as the material of a member for which slidability is required (sliding member). Examples of parts having these members include various bearings such as sliding bearings and thrust bushes, materials for bearing retainers, gears and chains, or electronic parts and optical parts. The slidability developed by the thermoplastic resin composition of the present invention can be utilized for the processability, releasability and non-sticking characteristics of the molded article when it is molded. The thermoplastic resin composition of the present invention makes use of these characteristics and is therefore unlimited to sliding members but also suitable to structural members of, for example, electric/electronic parts and optical parts, mechanical parts and mechanism parts. Examples of electric/electronic parts and optical parts include semiconductor production process-related products such as connectors, sockets, relay parts, coil bovines, optical pickups, oscillators, print wiring boards, circuit boards, semiconductor packages, computer-related products, camera mirror lens barrels, optical sensor cases, compact camera module cases (packages and mirror lens barrels), projector-optical engine structural members, IC trays, and wafer carriers; household electric product parts such as VTRs, television sets, clothes irons, air conditioners, stereo players, vacuum cleaners, refrigerators, rice boilers, electric pots, and luminaire; luminaire parts such as lamp reflectors and lamp holders; audio products parts such as compact disks, laser disks, and speakers; communication devices parts such as optical cable ferules, telephone parts, facsimile parts and modems; copying machine/printer-related parts such as separating claws and heater holders; mechanical parts such as impellors, fan gears, gears, motor parts and cases; automotive parts such as automotive mechanism parts, engine parts, engine room interior parts, automotive electronic parts, and interior parts; cooking equipment such as microwave cooking pans and heat resistant table dishes, heat insulating and sound insulting materials such as floor materials and wall materials; support materials such as beams and columns; construction materials such as roof materials, or civil and construction materials; air planes, spacecraft and space device parts, radiation facility members such as atomic reactors, marine facility members, cleaning instruments, optical instrument parts, valves, pipes, nozzles, filters, membranes, medical instrument parts and medical materials, sensor parts, sanitary parts, sport supplies and leisure supplies.

Molded articles obtained by using the thermoplastic resin composition of the present invention may be used in various applications as mentioned above. Because the molded article is excellent in abrasive resistance, it is suitable for HDD parts and, particularly, a lamp of a hard disk drive. Because the generation of abrasion powder can be well limited, HDD parts obtained using the thermoplastic resin composition of the present invention can significantly improve the reliability of a hard disk drive.

EXAMPLES

The present invention is described using the following Examples, but the present invention is not limited to the Examples. The thermoplastic resin compositions obtained in Examples were evaluated by the methods described below.

<Appearance>

The thermoplastic resin composition was molded into a flat plate of 64 mm×64 mm×3 mm which was provided with a film gate 1 mm in thickness in an injection molding machine to observe the plate visually as to whether the plate was uniformly formed or not and whether fine spots were present or not.

<Specific Gravity>

The thermoplastic resin composition was molded into an ASTM No. 4 dumbbell by an injection molding machine and measured according to ASTM D792 (23° C.). Even if a test piece of 64×64×15 mm (thickness) and a test piece 127 mm in length, 12.7 mm in width and 6.4 mm in thickness was used in place of the ASTM No. 4 dumbbell, the same results were obtained.

<Izod Impact Strength>

The thermoplastic resin composition was molded into a 6.4-mm-thick test piece (127 mm (length)×12.7 mm (width)× 6.4 mm (thickness)) by an injection molding machine and measured according to ASTM D256.

<Load Deflection Temperature>

The thermoplastic resin composition was molded into a 6.4-mm-thick test piece (127 mm (length)×12.7 mm (width)× 6.4 mm (thickness)) by an injection molding machine and measured according to ASTM D648.

<Friction Test>

The thermoplastic resin composition was molded into a flat plate of 64 mm×64 mm×3 mm by an injection molding machine. This molded article was measured using a HEIDON surface tester TYPE 14DR (manufactured by Shinto Scientific Co., Ltd.) where the molded article was rubbed reciprocally with an indenter made of a SUS 304 sphere having a radius of 0.25 mm under a load of 2 gf at a rate of 0.1 m/sec for a distance of 30 mm (rectangular wave) and this reciprocal rubbing operation was repeated 50000 times. The traces remaining on the surface of the molded article were compared with each other. The case where a clear trace (abrasion) remained and the generation of a dusty material was observed was rated as "poor", the case where a clear trace was observed was rated as "acceptable", the case where a trace was observed though it was not clear was rated as "good", and the case where almost no trace was observed was rated as "very good".

<Thrust Friction Test>

The molded article was subjected to a test carried out using a Suzuki-system friction abrasion tester (metal friction abrasion tester model 100-C, manufactured by Shimadzu Corporation) placed in a room conditioned at 23° C. under the conditions of a contact pressure of 0.05 MPa and a peripheral speed of 6 m/min for 24 hours to measure the coefficient of dynamic friction and wear amount of the molded article. The smaller the coefficient of dynamic friction is, the better the slidability of the molded article is and the smaller the wear amount is, the smaller the abrasion of the resin molded article is and the better the molded article is. As the counter material, SUS-306 of which the surface was abraded by #1200 sand paper was used.

<Polysulfone (A)>

As the polysulfone (A), a polyether sulfone ("Sumikaexcel 5003P" manufactured by Sumitomo Chemical Co., Ltd., hereinafter abbreviated as "PES1") was used. This PES1 has a repeat unit constituted of a p-phenylene group as each of the $Ph^1$ and $Ph^2$ in the above formula (1) and an oxygen-containing group as a terminal group. The PES1 has $8.6 \times 10^{-5}$ in a number of the oxygen-containing groups per 1 g of the PES1, and has a reduced viscosity of 0.51 dl/g.

Here, the amount (in number) of the oxygen-containing groups of the polysulfone (A) per 1 g of the polysulfone (A) was measured by dissolving a specified amount of the polysulfone (A) in dimethylformamide, adding an excess amount of paratoluenesulfonic acid and then, using a potentiometric titrating device, titrating the solution using 0.05 mol/L of a potassium-methoxide toluene methanol solution, reacting residual paratoluene sulfonic acid with the potassium methoxide, then, reacting the oxygen-containing groups (to be measured) of the polysulfone (A) with the potassium methoxide to obtain the amount by mole of the potassium methoxide required for the reaction, and then dividing the amount by the above specified amount (g) of the polysulfone (A).

The reduced viscosity of the polysulfone (A) was found as follows: about 1 g of the polysulfone (A) was dissolved in N,N-dimethylformamide to be a volume of 1 dl, the viscosity ($\eta$) of the obtained solution was measured at 25° C. by using an Ostwald's viscometer, and the specific viscosity ratio (($\eta - \eta_0)/\eta_0$) was divided by the concentration (about 1 g/dl) of the above solution.

<Fluororesin (B)>

As the fluororesin (B), PTFE ("Dyneon TF9205", hereinafter abbreviated as "PTFE1", manufactured by Sumitomo 3M Limited) was used. The flow initiation temperature of this PTFE1 was 330° C.

Also, PTFE ("Fluon L169J", hereinafter abbreviated as "PTFE2", manufactured by Asahi Glass Co., Ltd.) was used. The flow initiation temperature of this PTFE2 was 350° C.

<Liquid Crystalline Thermoplastic Resin (C1)>

A reactor equipped with a stirrer, a torque meter, a nitrogen gas introduction pipe, a temperature gauge and a reflux condenser was charged with 994.5 g (7.2 mol) of parahydroxybenzoic acid, 446.9 g (2.4 mol) of 4,4'-dihydroxybiphenyl, 299.0 g (1.8 mol) of terephthalic acid, 99.7 g (0.6 mol) of isophthalic acid and 1347.6 g (13.2 mol) of acetic acid anhydride, and 0.194 g of 1-methylimidazole as a catalyst and the mixture was stirred at ambient temperature for 15 minutes. After the atmosphere in the reactor was sufficiently replaced with a nitrogen gas, the temperature was raised with stirring. When the internal temperature reached 145° C., the mixture was stirred for 1 hour while keeping this temperature. Then, the mixture was heated up to 320° C. over 2 hours and 50 minutes while removing distilled acetic acid to be by-produced and unreacted acetic acid anhydride by distillation, and the reaction was considered to be completed when a rise in torque was observed, to obtain a prepolymer. The flow initiation temperature of the prepolymer was 261° C. The obtained prepolymer was cooled to ambient temperature and milled by a coarse mill to obtain a powder (particle diameter=about 0.1 mm to about 1 mm) of a liquid crystalline polyester. Then, the milled particles were heated from ambient temperature to 250° C. over 1 hour and from 250° C. to 285° C. over 5 hours in a nitrogen atmosphere and retained at 285° C. for 3 hours to undergo a polymerization reaction in a solid phase. The flow initiation temperature of the obtained polyester was 327°

C. The polyester obtained in this manner was used as the liquid crystalline thermoplastic resin (C1) (hereinafter abbreviated as "LCP1").

<Amorphous Thermoplastic Resin (C3)>

As the amorphous thermoplastic resin (C3), a polyether sulfone ("Sumikaexcel 4100P" manufactured by Sumitomo Chemical Co., Ltd., hereinafter abbreviated as "PES2") was used. The PES2 has a repeat unit constituted of a p-phenylene group as each of the $Ph^1$ and $Ph^2$ in the above formula (1), and has a chloro group as a terminal group and has no oxygen-containing group such as a hydroxyl group and an oxyanion group. The reduced viscosity of the PES2 is 0.41 dl/g.

Polyether imide ("Ultem 1010" manufactured by SABIC Innovative Plastics Co., Ltd.) (hereinafter abbreviated as PEI1") was used.

<Titanium Oxide>

As titanium oxide, "D2378" (manufactured by Sakai Chemical Industry Co., Ltd., hereinafter abbreviated as "$TiO_2$") was used.

Examples 1 to 9, Comparative Examples 1 to 8

The components shown in Tables 1 to 3 were mixed in the ratios shown in Tables 1 to 3 by using a Henschel mixer, and then, the mixture was granulated at a cylinder temperature of 350° C. by using a biaxial extruder ("PCM-30", manufactured by Ikegai Corporation) to obtain a pellet-like thermoplastic resin composition. After this thermoplastic resin composition was dried at 180° C. for 12 hours by using a hot-air circulation type drier, it was injection-molded at a cylinder temperature of 350° C. and a mold temperature of 150° C. by using an injection molding machine ("model PS40E-5ASE", manufactured by Nissei Plastic Industrial Co., Ltd.) to obtain each test piece, which was then evaluated by each of the above tests. The results are shown in Tables 1 to 3.

TABLE 1

|  |  | Example 1 | Example 2 | Example 3 | Comparative Example 1 | Comparative Example 2 |
|---|---|---|---|---|---|---|
| PES1 | (Parts by mass) | 5 | 5 | 5 | — | — |
| PTFE1 | (Parts by mass) | 10 | 20 | 2 | — | 10 |
| PTFE2 | (Parts by mass) | — | — | 18 | — | — |
| LCP1 | (Parts by mass) | 85 | 75 | 75 | 100 | 90 |
| Appearance |  | Uniform | Uniform | Uniform | — | Uniform |
| Izod Impact strength | (J/m) | 987 | 626 | 431 | 1350 | 1470 |
| Load deflection temperature | (° C.) | 258 | 263 | 236 | 230 | 242 |
| Friction test | Appearance | Very good | Very good | Very good | Good | Good |
| Thrust abrasion test | Coefficient of friction | 0.21 | 0.10 | 0.11 | Weld was broken | 0.24 |
|  | Wear amount (μm) | 0.42 | 0.90 | 0.07 | Weld was broken | 1.53 |

TABLE 2

|  |  | Example 4 | Example 5 | Example 6 | Example 7 | Example 8 | Comparative Example 3 | Comparative Example 4 | Comparative Example 5 | Comparative Example 6 |
|---|---|---|---|---|---|---|---|---|---|---|
| PES1 | (Parts by mass) | 3 | 15 | 5 | 15 | 5 | — | — | — | — |
| PTFE1 | (Parts by mass) | 10 | 10 | 20 | 20 | 10 | — | 10 | 20 | 10 |
| PES2 | (Parts by mass) | 87 | 75 | 75 | 65 | 80 | 100 | 90 | 80 | 85 |
| $TiO_2$ | (Parts by mass) | — | — | — | — | 5 | — | — | — | 5 |
| Appearance |  | Uniform | Uniform | Uniform | Uniform | Uniform | Transparent | Fine spots | Fine spots | Almost uniform |
| Izod Impact strength | (J/m) | 1560 | 1610 | 1060 | 1110 | 1340 | Unbroken | 1480 | 888 | 1150 |
| Load deflection temperature | (° C.) | 209 | 208 | 208 | 208 | 210 | 209 | 210 | 208 | 212 |
| Friction test | Appearance | Good | Good | Very good | Very good | Very good | Poor | Poor | Acceptable | Poor |
| Thrust abrasion test | Coefficient of friction | 0.18 | 0.13 | 0.12 | 0.11 | 0.21 | 0.54 | 0.28 | 0.29 | 0.33 |
|  | Wear amount (μm) | 20.9 | 15.8 | 10.2 | 8.83 | 10.5 | 66.1 | 45.9 | 25.8 | 32.3 |

TABLE 3

| | | Example 9 | Comparative Example 7 | Comparative Example 8 |
|---|---|---|---|---|
| PES1 | (Parts by mass) | 5 | — | — |
| PTFE1 | (Parts by mass) | 10 | — | 10 |
| PEI1 | (Parts by mass) | 85 | 100 | 90 |
| Appearance | | Uniform | Fine spots | Fine spots |
| Izod Impact strength | (J/m) | 904 | 1169 | 498 |
| Load deflection temperature | (° C.) | 197 | 197 | 199 |
| Friction test | Appearance | Good | Poor | Poor |
| Thrust abrasion test | Coefficient of friction | 0.15 | 0.63 | 0.35 |
| | Wear amount (μm) | 19.8 | 69.5 | 48.7 |

What is claimed is:

1. A thermoplastic resin composition comprising
a polysulfone (A) having oxygen-containing groups selected from among hydroxyl groups and oxyanion groups,
a fluororesin (B), and
a thermoplastic resin (C) other than the polysulfone (A) and the fluororesin (B), wherein the thermoplastic resin (C) is a liquid crystalline thermoplastic resin (C1) or polyether imide.

2. The thermoplastic resin composition according to claim 1, wherein the liquid crystalline thermoplastic resin (C1) is a liquid crystalline polyester.

3. The thermoplastic resin composition according to claim 2, wherein the liquid crystalline polyester is at least one selected from the group consisting of the following (C1-1), (C1-2) and (C1-3):

(C1-1): a liquid crystalline polyester having a repeat unit represented by the following formula (i);
(C1-2): a liquid crystalline polyester having a repeat unit represented by the following formula (ii) and a repeat unit represented by the following formula (iii); and
(C1-3): a liquid crystalline polyester having a repeat unit represented by the following formula (i), a repeat unit represented by the following formula (ii); and a repeat unit represented by the following formula (iii):

$$—O—Ar^1—CO— \quad (i)$$

$$—CO—Ar^2—CO— \quad (ii)$$

$$—O—Ar^3—O— \quad (iii)$$

wherein $Ar^1$ represents a 1,4-phenylene group, a 2,6-naphthalenediyl group or a 4,4'-biphenylylene group, $Ar^2$ and $Ar^3$ each independently represent a 1,4-phenylene group, a 2,6-naphthalenediyl group, a 1,3-phenylene group or a 4,4'-biphenylylene group, provided that hydrogen atoms of the group represented by $Ar^1$, $Ar^2$ or $Ar^3$ may be each independently substituted with a halogen atom, an alkyl group or an aryl group.

4. A molded article produced by molding the thermoplastic resin composition as claimed in claim 1.

5. A molded article produced by extrusion-molding the thermoplastic resin composition as claimed in claim 1.

6. A molded article produced by injection-molding the thermoplastic resin composition as claimed in claim 1.

7. A molded article produced by press-molding the thermoplastic resin composition as claimed in claim 1.

8. A structural part of a hard disk drive made from the molded article according to claim 4.

* * * * *